United States Patent [19]

Fricke

[11] Patent Number: 5,376,315
[45] Date of Patent: Dec. 27, 1994

[54] METHOD AND APPARATUS FOR CONCRETE CASTING OF A UNITARY STRUCTURE

[75] Inventor: Obed M. Fricke, Montezuma, Kans.

[73] Assignee: Kansas State University Research Foundation, Manhattan, Kans.

[21] Appl. No.: 230,425

[22] Filed: Apr. 19, 1994

Related U.S. Application Data

[63] Continuation-in-part of Ser. No. 960,541, Nov. 13, 1992, abandoned.

[51] Int. Cl.$^5$ .......................... B28B 7/10; E04B 1/16
[52] U.S. Cl. .................................... 264/31; 249/66.1; 249/144; 249/148; 264/35; 264/275; 264/279; 264/279.1; 264/334
[58] Field of Search ............. 264/31, 32, 35, 333, 264/219, 279, 279.1, 334, 275; 249/66.1, 39, 144, 148

[56] References Cited

U.S. PATENT DOCUMENTS

| | | | |
|---|---|---|---|
| Re. 25,758 | 4/1965 | LaMonica | 249/66.1 |
| 1,219,272 | 3/1917 | Edison | 264/31 |
| 1,970,860 | 8/1934 | Lowell | 264/69 X |
| 2,201,359 | 5/1940 | Whited | 249/144 |
| 2,228,123 | 1/1941 | McMurray | 249/144 |
| 2,894,311 | 7/1959 | Sinclair | 249/66.1 X |
| 3,297,295 | 1/1967 | Haas | 249/66.1 |
| 3,539,146 | 11/1970 | Smith | 249/66.1 X |
| 3,558,095 | 1/1971 | McNeil | 264/31 X |
| 3,687,597 | 8/1972 | Lavergne, Jr. | 249/144 X |
| 3,742,102 | 6/1973 | Stickler, Jr. | 264/31 X |
| 3,778,953 | 12/1973 | Delorean | 264/31 X |
| 4,042,659 | 8/1977 | Botting et al. | 249/144 X |
| 4,272,050 | 6/1981 | del Valle | 249/144 |
| 4,374,790 | 2/1983 | McGowan | 264/333 X |
| 4,427,619 | 1/1984 | Peterson | 249/144 X |
| 4,627,198 | 12/1986 | Francies, III | 264/256 X |
| 4,799,982 | 1/1989 | Vicino | 264/256 X |
| 5,246,640 | 9/1993 | Bryant | 264/31 X |

FOREIGN PATENT DOCUMENTS

| | | | |
|---|---|---|---|
| 1150074 | 7/1983 | Canada | 264/31 |
| 132140 | 8/1978 | Germany | 249/144 |
| 136598 | 1/1930 | Sweden | 249/148 |
| 653818 | 5/1951 | United Kingdom | 249/144 |

OTHER PUBLICATIONS

Concrete Trader, Feb. 1992; p. 5.
Concrete Trader, Mar. 1992, pp. 7–8.
Concrete Products, Apr. 1992, pp. 30–32.
Concrete Trader, Jun. 1992, "Precast Prisons cut construction time".
Brochure of ERSI-SET, "New Design Features".
Concrete Trader, Sep. 1991.

Primary Examiner—Karen Aftergut
Attorney, Agent, or Firm—Hovey, Williams, Timmons & Collins

[57] ABSTRACT

A simplified, low-cost forming system (46) and method for the rapid construction of integrated, monolithic cast structures such as storm shelters (20). The preferred forming system (46) includes an inner core form member (48) presenting a base (54) and upstanding sidewall structure (56), together with an open-top outer form member (50) having a circumscribing sidewall assembly (118) and a superstructure (120) releasably secured thereto. In use, the outer form member (50) is telescoped over the inner core form member (48), with the distance between the form walls defining the thickness of the resulting shelter (20); preferably, a reinforcing grid (52) and door frame (32) are located between the form members (48, 50). After form assembly, concrete (178) is poured through the open top of the outer form member (50) to fill the complete form. Upon setting of the concrete (178), upper jacks (182) are positioned between the superstructure (120) and the shelter (20), and are used to separate and allow complete removal of the outer form member (50). The shelter (20) is then separated from the inner core form member (48) through use of lower jacks (82) which elevate the shelter (20) relative to the inner core form member (48). In a second embodiment of the invention, a second outer form member (200) includes corner jacking assemblies (202, 204, 206, and 208) for expediting separation of the shelter (20) and the second outer form (200).

12 Claims, 8 Drawing Sheets

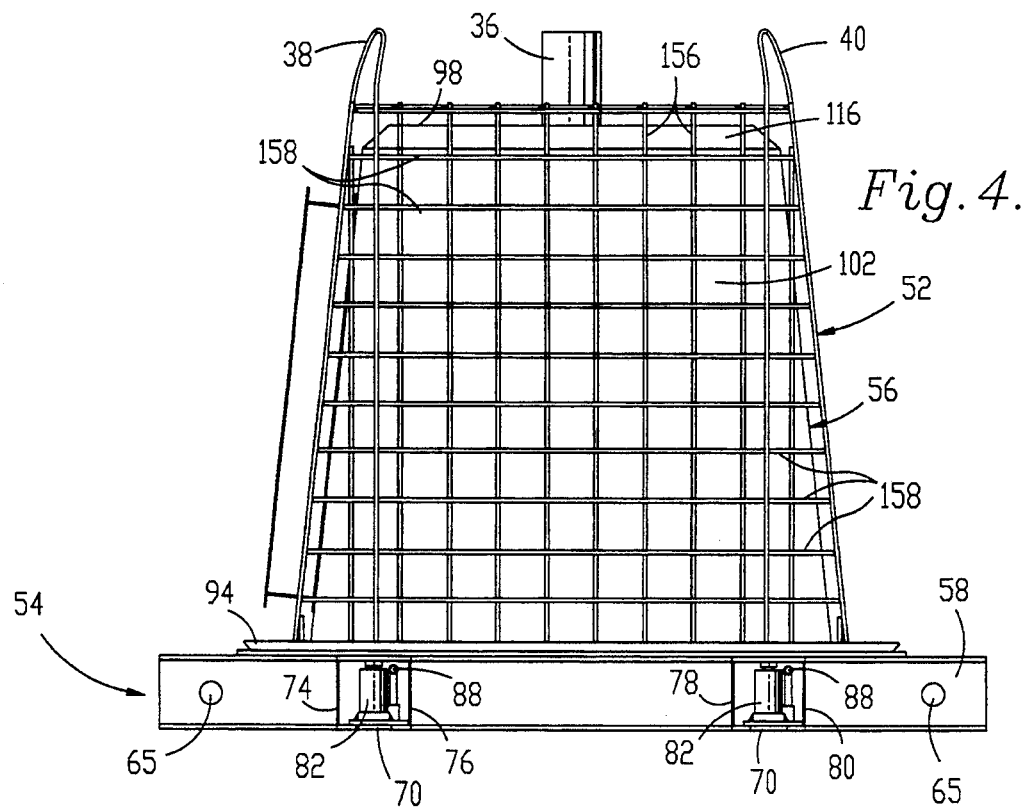
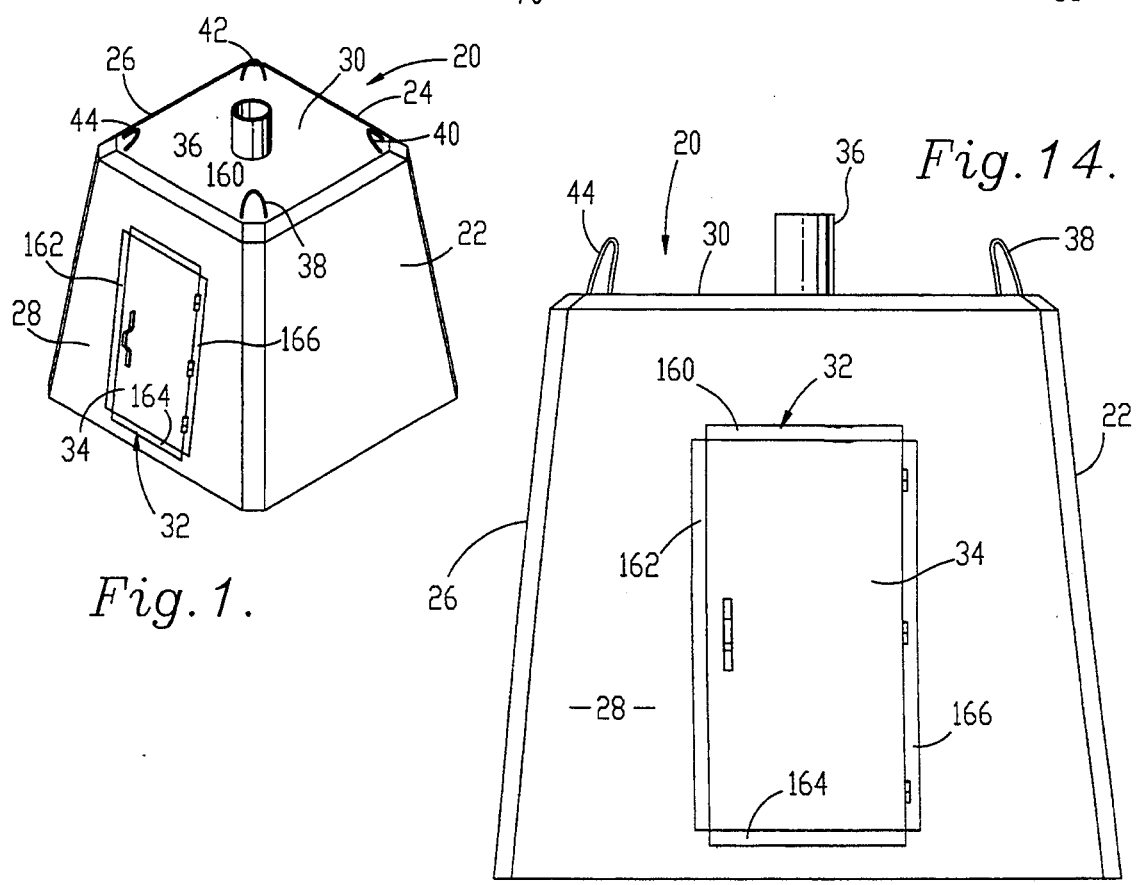

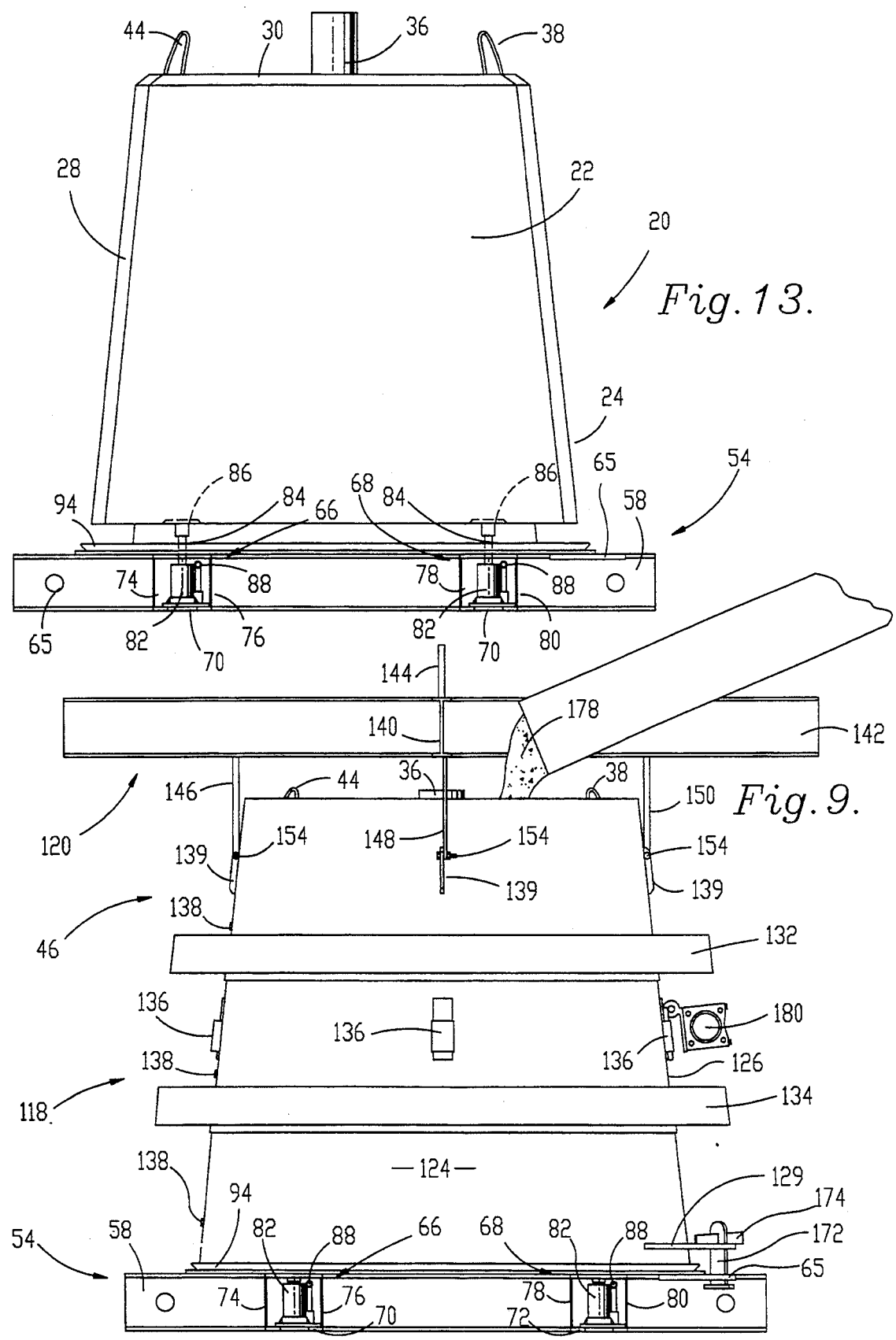

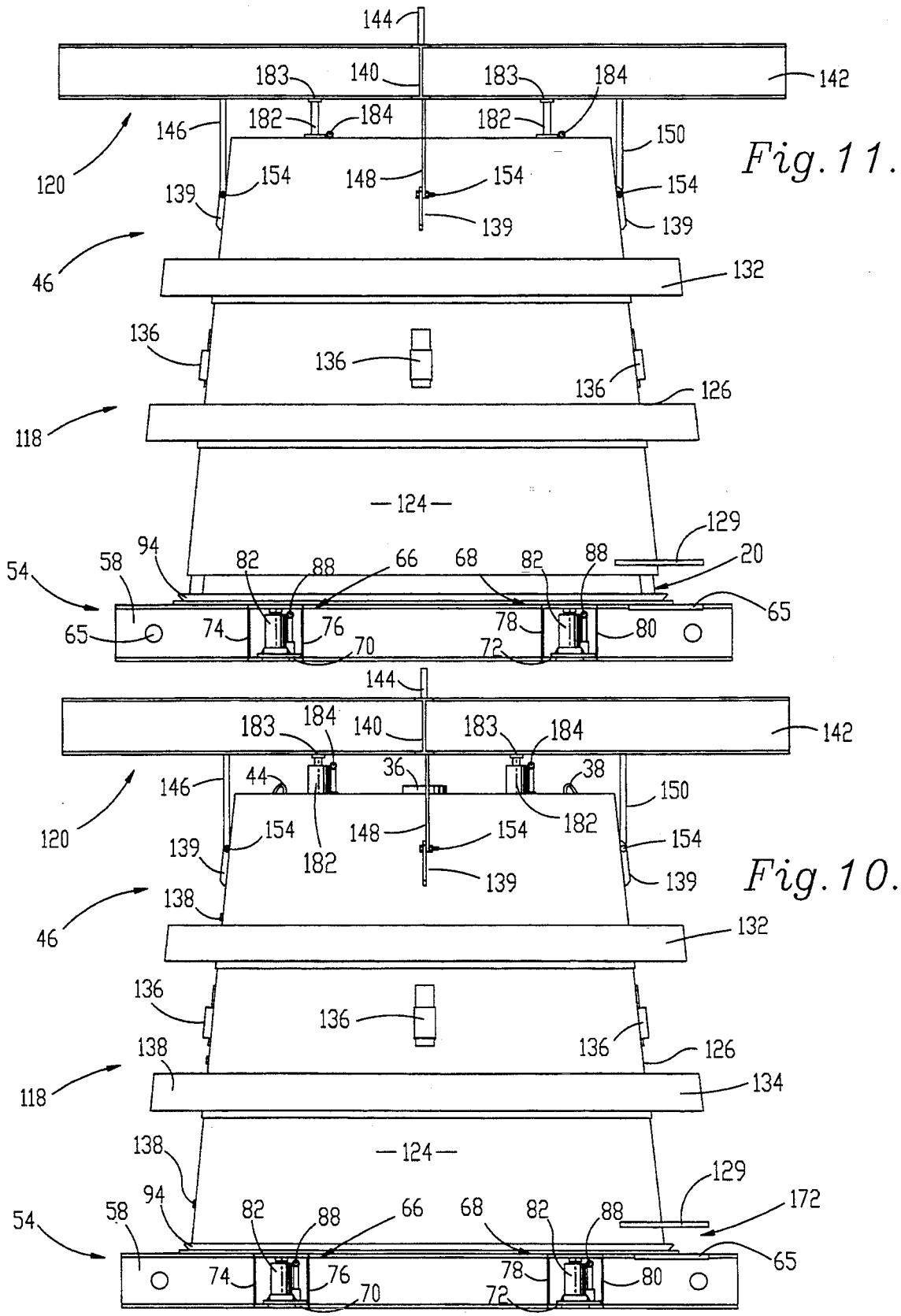

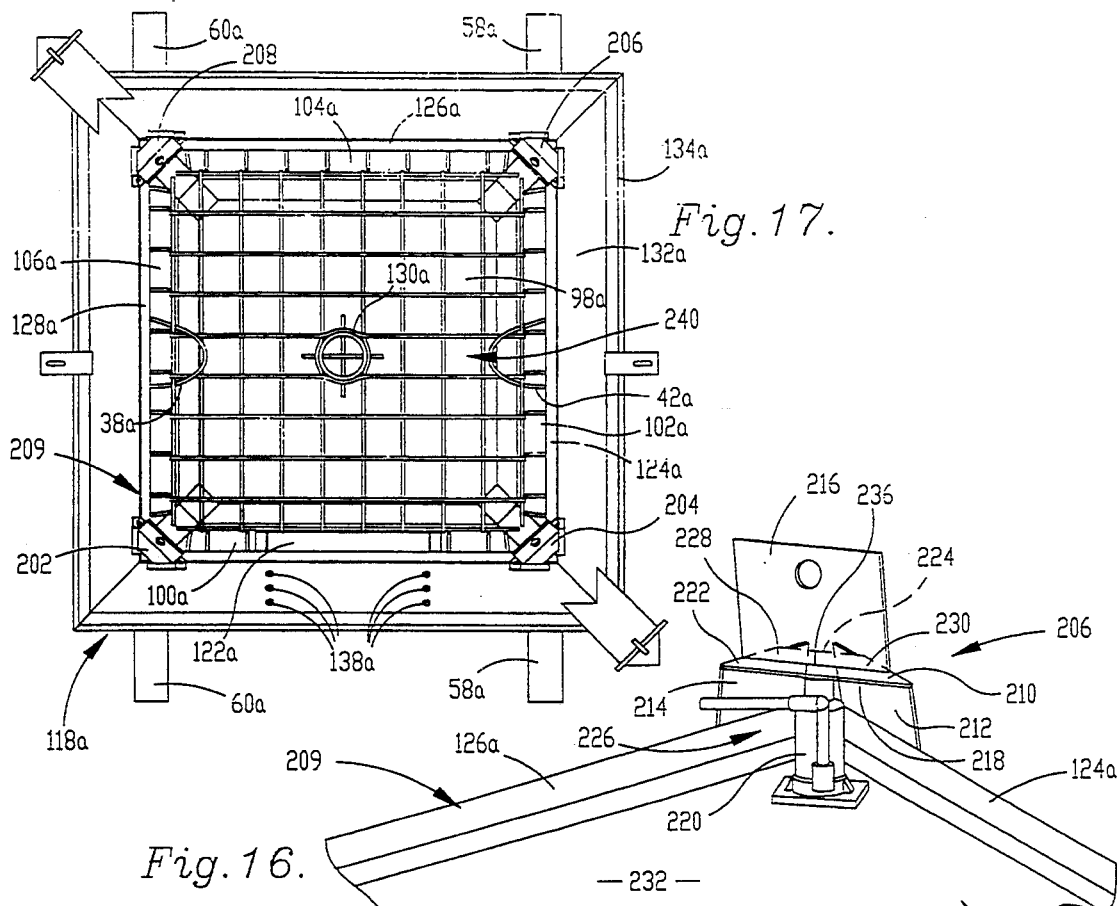

METHOD AND APPARATUS FOR CONCRETE CASTING OF A UNITARY STRUCTURE

RELATED APPLICATION

This application is a continuation-in-part of application Ser. No. 07/960,541, filed Nov. 13, 1992, now abandoned.

BACKGROUND OF THE INVENTION

1. Field of the Invention

The present invention is broadly concerned with an improved casting method and apparatus particularly adapted for low-cost, high-output production of unitary, monolithically formed structures such as pet houses, storm shelters, box culverts and modular rooms. More particularly, it is concerned with a casting or forming system making use of inner and outer, telescopically interfitted form members provided with selectively operable jacking structures for quickly and easily separating the forms from a completed, cast structure without the need for disassembly of either form member.

2. Description Of The Prior Art

A large number of reusable, metallic concrete forms have been used in the past in the fabrication of walls, tubes or other structural components. Generally speaking, such forms are provided with connection hardware such as crosspieces and pin assemblies for coupling of form sections on site. Such procedures are time-consuming and necessitate disassembly of the entire form after each use thereof.

It has also been known in the past to factory form relatively small concrete enclosures such as storm shelters with reusable forms. Here again, these prior forms are characterized by a plurality of interconnected panels which must be at least partially disassembled after each enclosure is cast. Furthermore, the seams between form panels tend to leak concrete, which necessitates additional time in cleaning of the forms after use. A related problem with typical concrete forms in this context is that they can be used only for the production of a tubular, box-like structure which must then be capped with a separate ceiling section to form a complete enclosure. A patent to Haas, U.S. Pat. No. 3,297,295, discloses an apparatus for removing forms from large concrete tanks having a bottom. The '295 patent teaches a forming system having an inner mold, an outer mold having an open top, and jacking beams extending across the top. These beams support a jacking mechanism that also presses against a solid concrete body within the form. In this manner, the outer form may be separated from the solid body by operating the jack to exert a lifting force. Nevertheless, the beams are positioned in an awkward position (across the middle of the open top of the outer form) that interferes with concrete pouring operations as the assembled form is filled with concrete. Furthermore, top jacking from a crossbeam can cause uneven jacking forces that, due to small uneven form movements during jacking operations, may bind the outer form with the formed concrete body as the outer form is removed.

There is accordingly a need in the art for an improved casting method and apparatus which eliminates form disassembly while also permitting casting of complete, monolithic enclosures in a single step while providing easy separation of the casting form members from the enclosures.

SUMMARY OF THE INVENTION

The present invention overcomes the problems outlined above and provides a forming or casting system adapted for use in fabricating integral structures with the complete elimination of form disassembly. Broadly speaking, the system of the invention includes an inner core form member presenting an outer surface corresponding to a desired inner surface for the structure to be cast, together with an open-ended, outer form member preferably presenting a circumferentially unitary sidewall having an inner surface corresponding to a desired outer surface for the cast structure. In use, the inner core member is at least partially located in the confines of the outer form, such that the distance between the inner and outer members defines the wall thickness of the resultant cast structure. The overall system also includes means for selective separation of the outer form member from the cast structure, and also for selectively separating the inner core form member from the structure.

In preferred forms, the inner core member includes a unitary, circumferential sidewall with an end panel closing one end of the sidewall; the circumferential sidewall is preferably made up of four permanently interconnected panel sections, which are tapered and converge from the base to the closing panel. The cooperating outer form member is likewise preferably formed of permanently interconnected sections, and is complementally tapered. An upper jacking system affixed to a beam above the outer form is used for separating the outer form member from a completed, cast structure. Also, a lower jacking system forming a part of the base of the inner core form member is used to elevate the form structure away from the inner core form member.

In order to provide structural rigidity for the formed structure, use is preferably made of a reinforcing grid placed between the inner and outer form members. This grid may also include means defining a door frame or other opening through a sidewall of the complete structure, and moreover may include lift sections designed to extend above the normal roof of the complete structure.

In a preferred embodiment, the outer form member includes a first corner jacking brace having a jacking plate supported above an open top end of the outer form. The jacking plate is held in position by a pair of risers or vertically oriented plates. These risers preferably retain the jacking plate over the open top end a sufficient distance to allow a bottle jack to press against the jacking plate and a solidified body within the mold cavity. The jacking plate may also be coupled with an upstanding pick-up plate having an aperture for use in coupling with a sling assembly that may be used to lift the outer form member. A plurality of these corner jacking braces may be positioned on corners located at diagonals across the open top end for use in a tandem jacking method that prevents binding of the outer form as it is removed from the interior solidified concrete body.

BRIEF DESCRIPTION OF THE DRAWINGS

FIG. 1 is an isometric view of a unitary, monolithically cast storm shelter produced using the forming apparatus of the invention;

FIG. 4 is a side elevational view depicting a reinforcing grid placed over the inner core form member;

FIG. 9 is a view similar to that of FIG. 7, but depicting pouring of concrete into the form assembly;

FIG. 10 is another view similar to that of FIG. 9, but showing the placement of upper lifting jacks between the cross-beam assembly of the outer form member and the cast structure;

FIG. 11 is a view similar to that of FIG. 10, but illustrating the jack assemblies in their elevated positions, with the outer form member lifted and separated from the cast structure;

FIG. 13 is a side elevational view depicting separation of the cast structure from the inner core form member via the lower jacking assemblies carried by the inner core form member base; and FIG. 14 is a side elevational view of the completed, cast structure with door attached.

FIG. 15 is a side elevational view of a second embodiment the invention including a second outer form member having a plurality of upper corner jacking assemblies;

FIG. 16 is a fragmentary perspective view depicting a corner jacking assembly thereof; and FIG. 17 is a plan view depicting the outer form of FIG. 15 positioned prior to a concrete pour.

DETAILED DESCRIPTION OF THE PREFERRED EMBODIMENTS

Figure 3:
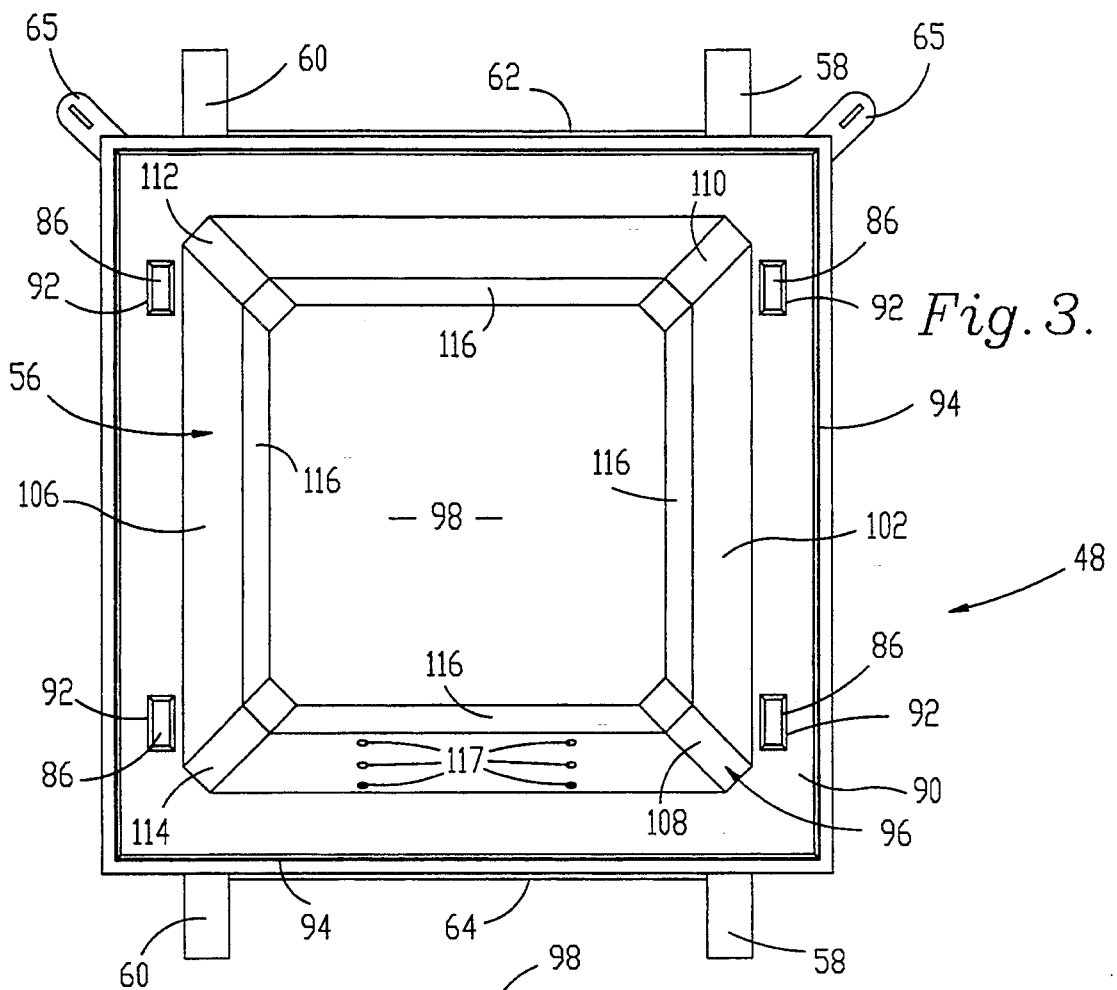
FIG. 3 is a plan view of the inner core form member shown in FIG. 2.

Turning now to the drawings, FIGS. 1 and 14 illustrate a representative type of unitary, monolithically cast structure or enclosure which can be produced using the forming system of the invention. In particular, these Figures depict a floorless storm shelter 20 adapted to be placed directly on the earth or on a precast pad to form a highly weather-resistant emergency shelter for tornado-prone locales. The shelter 20 includes a total of four trapezoidally-shaped sidewalls 22-28 as well as a cap roof 30. As shown, the sidewalls 22-28 are each tapered and converge from bottom to top toward roof 30. Moreover, the sidewall 28 is equipped with a rectangular metallic door frame 32 and a door 34 hinged to the frame 32, thereby permitting access to the interior of the shelter. An upright ventilation pipe 36 is cast into roof 30 and communicates with the interior of the shelter. Finally, a total of four reinforcing bar loops 38-44 extend from roof 30 adjacent the corners thereof, in order to facilitate lifting of the shelter 20 via a crane or similar expedient.

As indicated, the sidewalls 22-28 and roof 30 are monolithically cast, so that there are no seams or jointed interconnections between these structural components. This creates an extremely sturdy shelter resistant to all weather conditions.

The shelter 20 can be produced using the forming system 46 of the invention, which broadly includes an inner core form member 48 (FIGS. 2-3), as well as an outer form member 50 (see FIGS. 7-12). Preferably, the overall forming system 46 further includes a reinforcing bar grid 52 (FIGS. 5-6) which is situated between the form members 48, 50 and is cast into the completed shelter 20.

Figure 2:
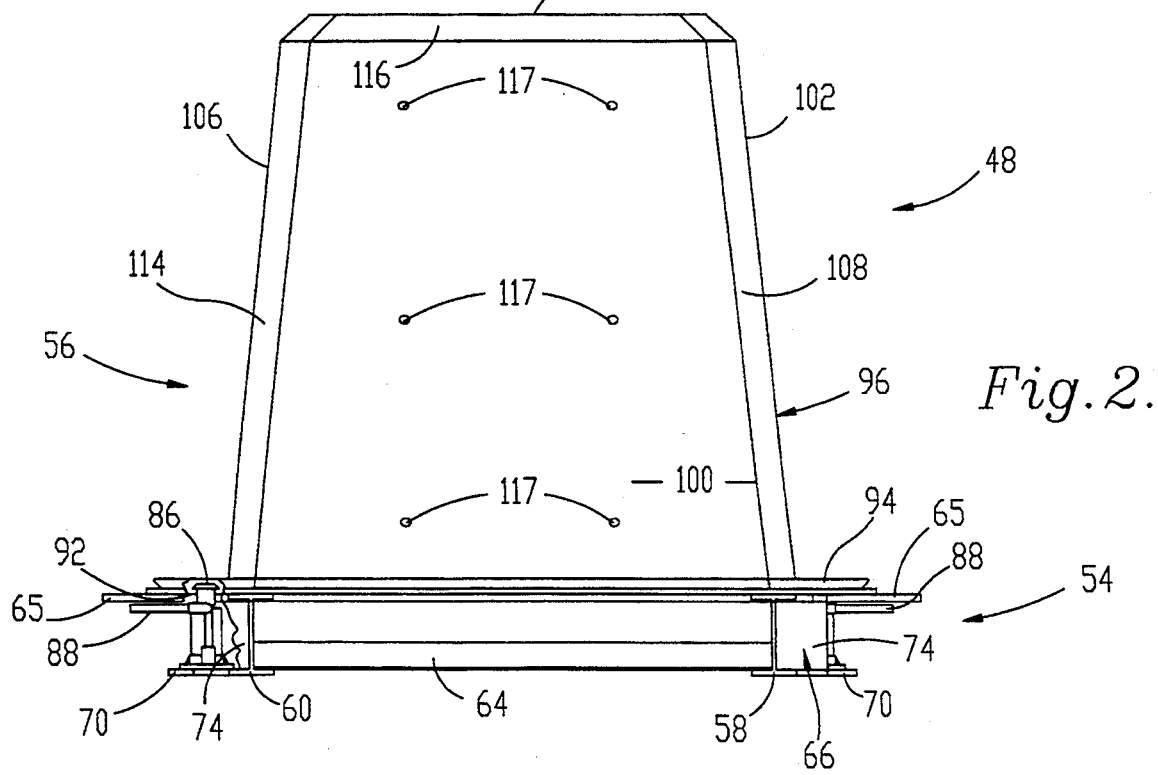
FIG. 2 is a side elevational view of the inner core form member, with parts broken away to illustrate a jacking member associated with the base of the inner core form member.

In more detail, inner core form member 48 includes a base 54 as well as an upstanding form-defining continuous wall structure 56. The base 54 includes a pair of lowermost, parallel, spaced apart I-beam rails 58, 60 interconnected by means of a pair of spaced transverse cross beams 62, 64. As best seen in FIGS. 2-3, a pair of outwardly extending, plate-like, slotted connectors 65 are secured to base 54 at the corners thereof adjacent the upper ends of the beams 58, 60, as viewed in FIG. 3. The rails 58, 60 each carry a pair of spaced apart, outwardly extending housings 66 and 68 which are respectively located inboard of the cross beams 62, 64. Each of the housings 66, 68 includes a bottom plate 70, 72 which extends laterally outwardly from the lower segment of the adjoining I-beam rail, as well as a pair of upright, spaced apart sidewalls 74, 76 and 78, 80. Each of the housings 66, 68 receives a manually operable bottle jack 82 which sits atop the corresponding housing bottom plate 70, 72 and has an upwardly extendable rod 84 (see FIG. 13) as well as an uppermost rectangular pad 86 secured to the rod 84. The respective jacks 82 are operable through manual handles 88 as shown.

In an alternate and preferred embodiment, a jacking system can be provided which includes a common pump coupled via a manifold and hoses to four separate cylinder jacks positioned in the location of the bottle jacks 82. Operation of the common pump thereby provides for simultaneous lifting of all of the cylinder jacks. This common pump may be either manually or electrically powered. One type of pump useful in this application would be an Enerpack P-392 hand pump attached to a Model A-66 manifold via a hose; this manifold is then coupled by four separate hoses to four Enerpack RC-152 cylinder jacks each having a 15 ton lifting capacity.

The overall base 54 further includes a square, metallic, peripheral flange 90 presenting a central, square opening and which is secured to the upper ends of the rails 58, 60. The flange 90 is provided with a total of four rectangular openings 92 oriented to receive therein the respective jack pads 86. In addition, the flange 90 includes an upstanding, obliquely oriented, continuous, circumscribing lip 94 secured to the upper surface thereof.

The wall structure 56 is permanently affixed to flange 90 by welding or the like and includes a circumferentially unitary sidewall 96 as well as a top wall 98 unitary with the sidewall 96. In detail, it will be observed that the sidewall 96 is made up of a total of four trapezoidal panel sections 100, 102, 104, 106, interconnected at their respective side marginal edges by means of narrow connector segments 108, 110, 112, 114. The panel segments 100-106 are each tapered (preferably approximately 6°) so that the entire sidewall 96 converges from base 54 to top wall 98. Top wall 98 includes a circumferentially extending, narrow, chamfered margin 116 as illustrated. The bottom of wall structure 56 is open, and communicates with the opening defined by the flange 90. A multiple-bar, grid-type metallic reinforcement (not shown) is situated within the confines of wall structure 56 to rigidify the entire assembly. Finally, the panel section 100 includes a total of six threaded bores 117 therein for purposes to be described (see FIG. 2).

Figure 8:
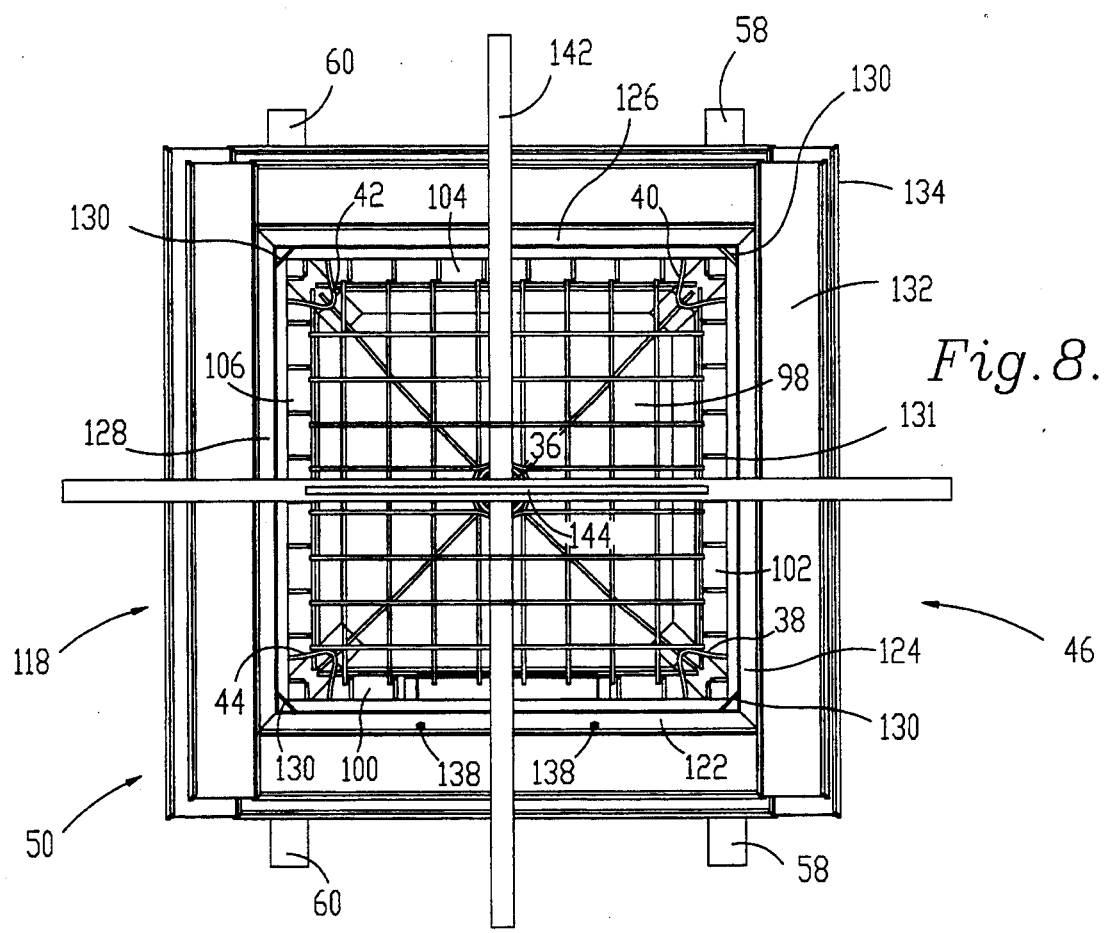
FIG. 8 is a plan view of the complete form arrangement illustrated in FIG. 7.
Figure 7:
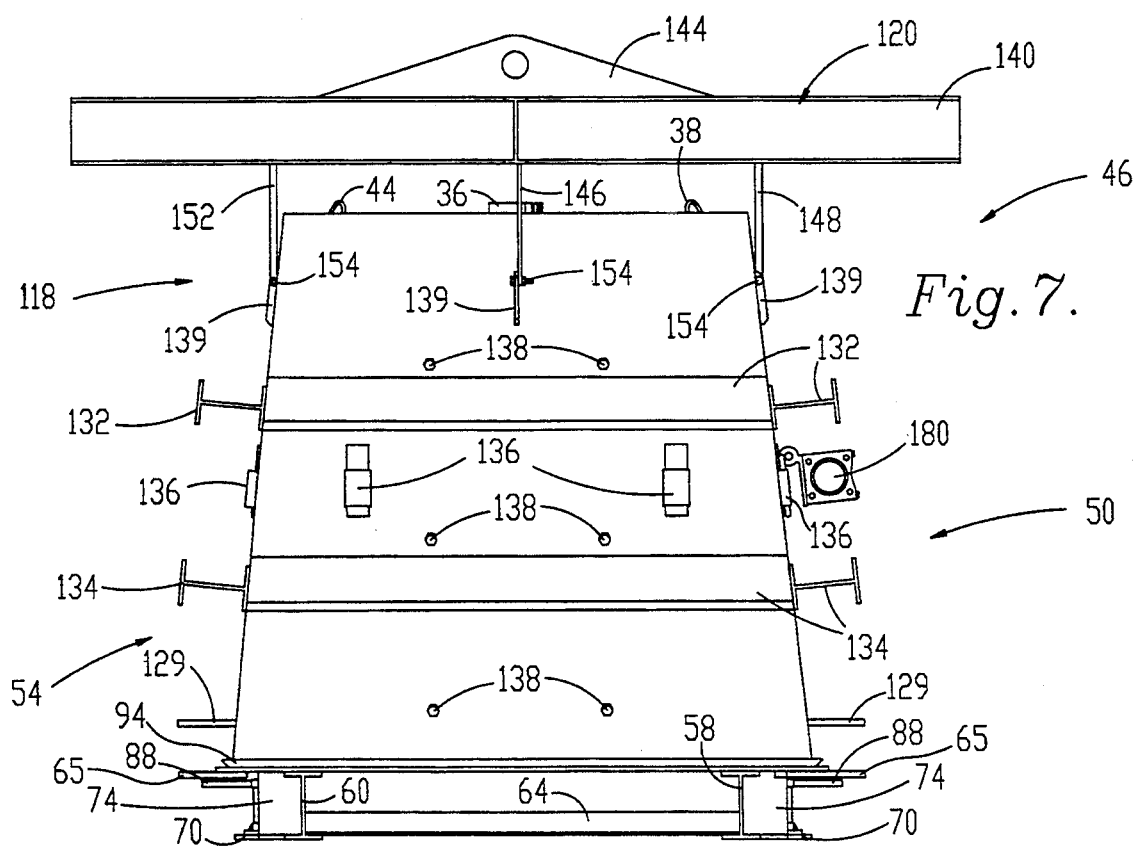
FIG. 7 is a side elevational view illustrating placement of the outer form member over the form member and grid assembly illustrated in FIGS. 4-6.
Figure 12:
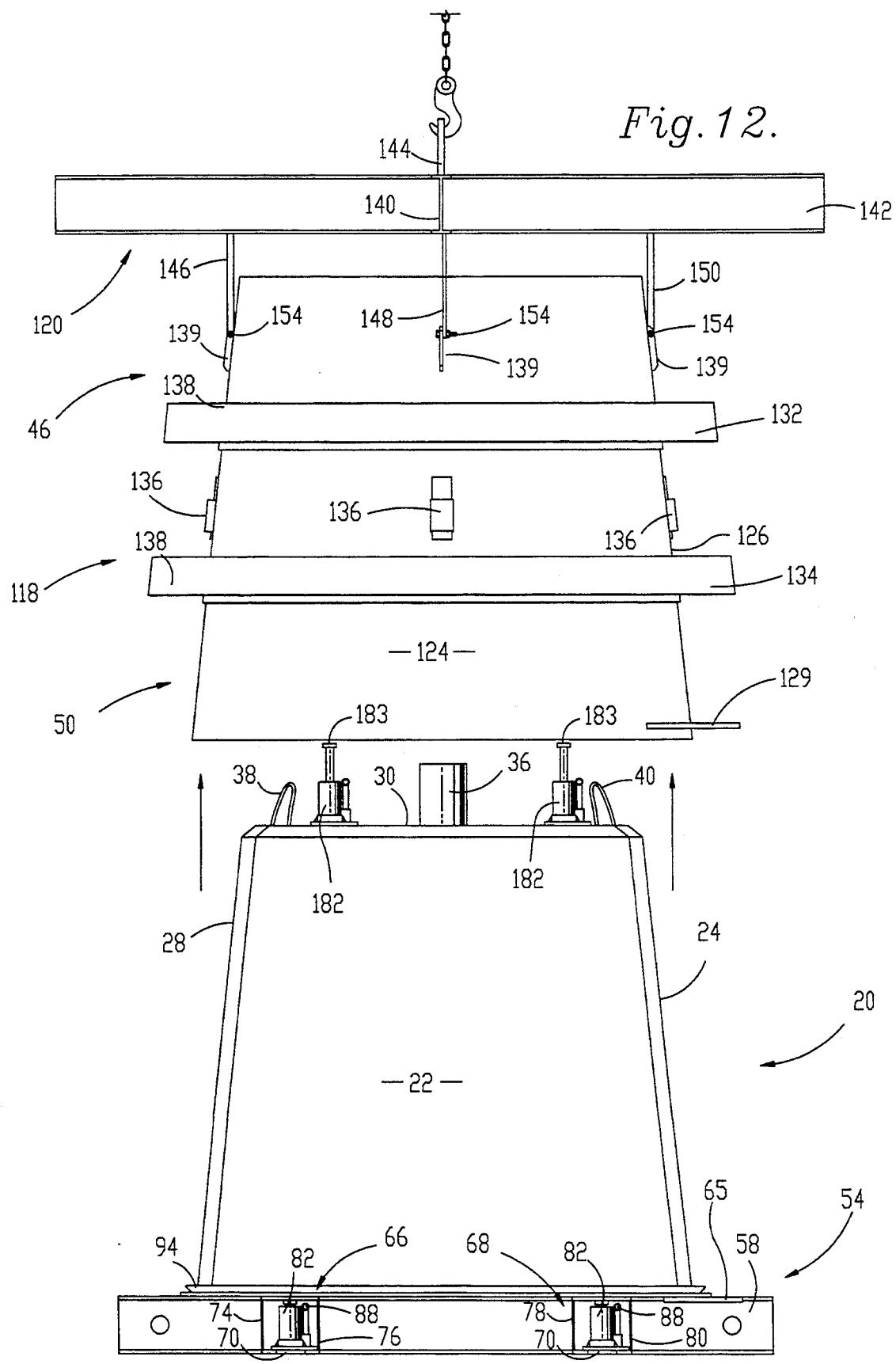
FIG. 12 is an elevational view depicting the step of complete removal of the outer form member from the cast structure and inner core form member.

The outer form member 50 is best illustrated in FIGS. 7-8 and is in the form of a tapered, tubular, open top, circumferentially unitary sidewall assembly 118 with a superstructure 120 removably secured to the upper end thereof. Sidewall assembly 118 is made up of four sidewall panels 122, 124, 126, 128, each being generally trapezoidal in configuration and permanently interconnected by welding or the like at the respective margins thereof to the adjoining section. The overall sidewall assembly presents a tapered, converging configuration from bottom to top, and is complemental with the taper of wall structure 56 of inner core form member 48. A pair of outwardly extending, plate-like, slotted connectors 129 are respectively affixed to the two corners defined by panels 124, 126 and 128. The inner face of the sidewall assembly 118 presents at each respective corner an upstanding, relatively narrow face plate 130 which is complemental with the connector segments 108-114 provided on wall structure 56. If desired, the lower margin of the sidewall assembly 118 may also be provided with a short, oblique, outwardly extending skirt section adapted to mate with lip 94 of flange 90. Furthermore, as best seen in FIG. 8, relatively narrow, circumferential angle iron 131 is welded at the upper end of the outer form member 50 on the inside thereof. This angle iron 131 is oriented at 45° angle to provide a corresponding chamfer at the upper edge of the completed shelter 20.

Two vertically spaced tiers of I-beam support rails 132, 134 are affixed to the outer faces of sidewall panels 122-128, and a series of vibrator brackets 136 are secured to each such panel between the I-beam rails 132, 134. A total of six door frame attachment apertures are provided in sidewall panel 122, with these openings being in alignment with bores 117 of panel section 100. The apertures receive corresponding door frame mounting bolts 138 which are threaded into the bores 117. A total of four apertured, upright connector elements 139 are also respectively affixed to the panel sections 100-106 above rail 132.

The superstructure 120 includes a pair of orthogonally interconnected I-beams 140, 142, with the beam 140 carrying an upright, apertured extension 144. Four depending, apertured connector straps 146, 148, 150, 152 are secured to the I-beams 140, 142, and are releasably connected via pins 154 to the connector elements 139.

Figure 5:
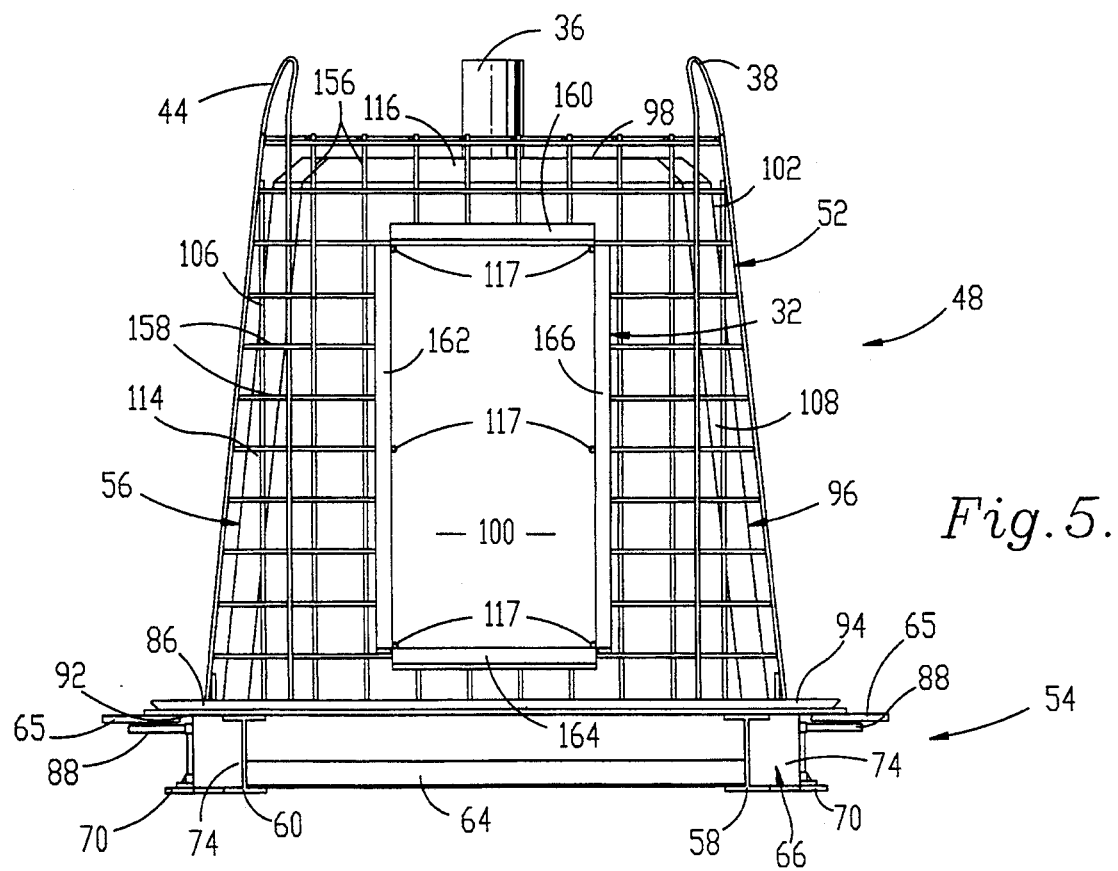
FIG. 5 is a side view of the grid and inner core form member shown in FIG. 4, but illustrating the door frame structure supported by the grid.

The grid 52 is made up of a metallic reinforcing bar and is configured to fit over and generally conform with wall structure 56 of inner core form member 58. The grid 52 as illustrated includes upstanding, laterally spaced apart bars 156, as well as circumferentially extending, horizontally spaced apart cross bars 158. These segments cooperatively present inclined, converging sidewall panels and a horizontal roof panel for the grid which complementally fit over the wall structure 56. Four corner loops 38-44 extend above the main body of the grid as best seen in FIG. 5. The described grid arrangement of interconnected metallic bars is interrupted in one sidewall panel so as to accommodate metallic door frame 32. The latter is made up of four welded together channel iron segments 160, 162, 164, 166. Finally, the roof panel section of the grid 52 is provided with a pair of orthogonally and diagonally arranged, pipe-supporting bars 168, 170 which intersect in the middle of pipe 36.

The method of casting a shelter 20 using the forming system 46 will next be described. In the first step, the inner core form member 48 is placed upon a suitable solid surface, and the respective jacks 82 are lowered to the positions illustrated in FIGS. 2-3, wherein the pads 86 are received within the corresponding openings 92.

Figure 6:
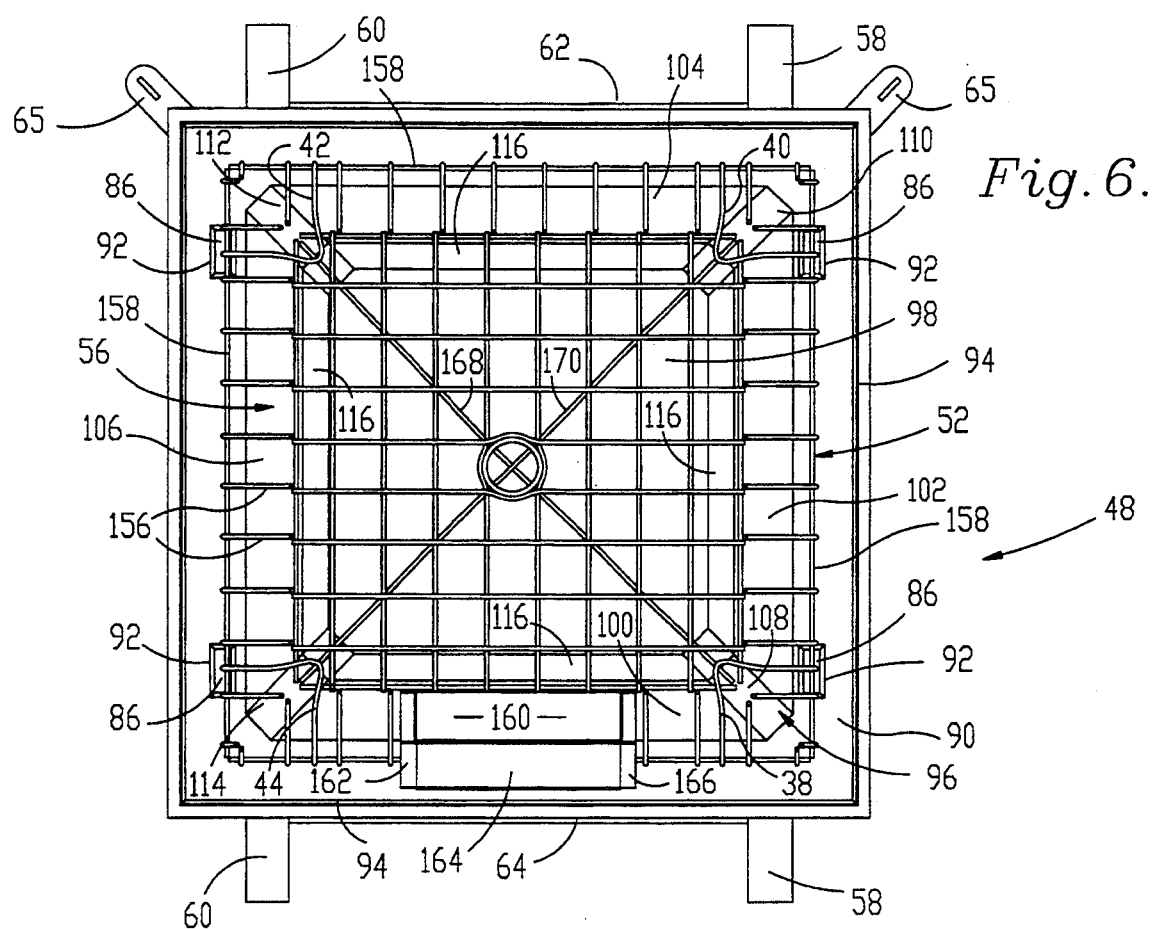
FIG. 6 is a plan view of the assembly depicted in FIG. 5.

At this point, the grid 52 and door frame 32 are positioned over the upstanding wall structure 56 of the inner core form member 48. This placement is illustrated in FIGS. 4-6, where it will be observed that the grid 52 is simply hoisted over the wall structure 56 and lowered until the bottom margin of the grid rests on flange 90 inboard of lip 94. The door frame 32 is then installed adjacent panel section 100 (the corresponding grid section having a rectangular opening at this point to accommodate the door frame) by simply placing the frame within the opening proximal to the threaded bores 117 and allowing the grid to support the door frame. Next, the pipe 36 is driven into the central region of the top panel of the grid 52, which effects a slight bending of the adjacent grid-defining bars and firmly holds the pipe in place. The completed subassembly of the inner core form member 48 and grid 52 is illustrated in FIGS. 5 and 6.

In the next step, the outer form member 50 with superstructure 120 attached thereto is telescoped over the subassembly illustrated in FIGS. 5-6, until the lower margin of the sidewall assembly 118 rests atop flange 90. It will be appreciated that the frame member 50 is oriented so that the six apertures through sidewall section 122 come into alignment with the threaded bores 117 provided in panel section 100; moreover, the connectors 129 of the outer form member 50 directly overlie the connector 65 affixed to base 54 of the inner core form member 48. At this point, bolts 138 are installed through the outer form member apertures and threaded into the bores 117, in order to hold the door frame 32 firmly in place between the inner and outer form members. Of course, the lateral distance between the wall structure 56 of form member 48 and sidewall assembly 118 of member 50 defines the wall thickness for the shelter 20; likewise, the outer surface of the member 48 corresponds to the inner surface for the shelter, whereas the inner surface of the sidewall structure 118 defines the outer surface for the shelter.

After the outer form member 50 is initially put in place and the bolts 138 installed, a pair of elongated, flat, slotted pins 172 (FIG. 9) are respectively driven upwardly through the slots of the associated connectors 65, 129 at each rear corner of the assembly remote from the door frame bolts 138. Interconnection between the inner and outer form members 48, 50 is completed at these corners by driving wedges 174 through the slots of pins 172 so as to effect a tight frictional connection between the wedges 174 and the connectors 129.

FIG. 9 depicts the next step wherein a suitable concrete mix 178 is poured into the completed form through the open top of the outer form member 50, and is continued until the entire form is filled up to a point close to the uppermost margin of the sidewall structure 118. In this respect, the circumferential angle iron 131 is used as a convenient gauge when pouring the concrete mix into the completed form assembly, i.e., concrete is poured to the upper margin of the angle iron 131. This insures that both the walls and roof of the structure are poured monolithically and in appropriate thickness. It will be appreciated in this respect that the open top construction allows rapid pouring and filling of the form assembly, as compared with a system wherein only relatively narrow walls are poured. In order to insure rapid filling of the form structure and appropriate consolidation of the concrete, use may be made of conventional vibrators 180 attached via the brackets 136 (see FIG. 9).

The poured concrete is next allowed to set for a time sufficient to insure appropriate solidification and curing thereof (e.g., if use is made of 6000 psi concrete at an ambient temperature of 70° F. or higher, a 4 hour curing time is optimum), whereupon the initial form separation sequence is begun. In the first step of this procedure, the bolts 138 are removed and the pin and wedge connector assemblies 172, 174 are released. Next, as illustrated in FIGS. 10-11, a pair of jacks 182 are positioned on the now solidified roof 30 of the cast shelter 20, with the contact pads 183 thereof directly beneath I-beam 142. These jacks are manipulated via their operating handles 184 in order to extend the rods and contact pads 183 upwardly, thereby exerting an upwardly directing lifting force against superstructure 120. Inasmuch as the latter is connected through the straps 146 and elements 139, it will be appreciated that the jacks serve to separate and elevate the outer form section 50 from the shelter 20. Once the section 50 is broken away from the structure 20, the entire section 50 may be lifted by means of a crane or the like completely off of the cast structure, and the jacks 182 are removed. This operation is illustrated in FIG. 13. In a more preferred embodiment, a common Enerpack pump with four interconnected and spaced apart jacks as described previously can be used for this initial form separation step. Use of the two jacks 182 may in certain cases be insufficient to strip an outer form member, particularly where large structures are being cast.

In order to separate the cast structure 20 from the inner core form member 48, the lower jacks 82 come into play. These lower jacks are operated through their crank handles 88, so that the pads 86 thereof contact the underside of the structure 20 and separate it from the sidewall structure 56. Such initial separation is depicted in FIG. 13. Thereafter, a crane may be used to lift the entire form structure 20 off of the inner core form member 48, making use of the loops 38–44 for this purpose. The structure 20 is then placed at grade, whereupon the door 34 may be attached to frame 32 in the usual manner, thereby completing the shelter. Of course, where an Enerpack common pump and multiple jack system is used, the pump is actuated to simultaneously elevate the lifting jacks.

It will be appreciated that the present invention provides a method and apparatus which materially lessens the time and difficulty associated with the fabrication of forms and the ultimate casting of structures, particularly monolithic structures having both a continuous sidewall and a roof. Indeed, practice of the invention eliminates up to 70% of the labor involved in typical setup, pouring and stripping operations followed in conventional practice. This follows from the fact that in preferred forms, the inner and outer form members are unitary and require no assembly. Moreover, the lack of seams virtually eliminates concrete leakage and the necessity for cleaning the form members. Finally, the jacking systems employed for separation of the forms from the completed structure represents a very significant time-saving feature.

FIGS. 15-17 depict a second embodiment of the invention, which includes second outer form member 200. In these Figures, identical elements with respect to the first embodiment of FIGS. 7 and 8 (first form member 50) are provided with the suffix "a." In the embodiment of FIGS. 15-17, I-beams 140 and 142 are removed, and wall structure 118a is provided with a plurality of identical corner jacking assemblies 202, 204, 206, and 208. Note that corner jacking assemblies 202-208 occupy the corner areas of open top perimeter 209; therefore, the opposed rebar handles, for use in picking up a finished unitary concrete structure, have been relocated to respective median positions opposite walls 128a and 124a.

FIG. 16 depicts a corner jacking assembly 206 in greater detail. Jacking assembly 206 includes a triangular jacking plate 210, a pair of riser plates 212 and 214, and a pick-up plate 216.

Jacking plate 210 has a substantially horizontal orientation presenting a lowermost jacking surface 218 for contact with bottle jack 220, and an uppermost surface 222 for contact with pick-up plate 216. Plate 210 is depicted as having the corner point area 224 of its triangular perimeter truncated.

Riser plates 212 and 214 are respectively welded to corresponding marginal wall structure 118a, specifically, the planar outer surfaces of walls 126a and 124a which meet to form corner 226. Plates 212 and 214 form extensions of walls 126a, which rise to meet jacking plate 210 at a right angle along welds 228 and 230. Plates 212 and 214 retain jacking plate 210 a sufficient distance above concrete upper surface 232 for positioning of bottle jack 220 thereunder when the outer form 200 is removed from a cast body.

Pick-up plate 216 rises vertically from weld line 236 at surface 222. Plate 216 has a central aperture in its uppermost half, which is sized to receive a hook or sling assembly (not depicted) for lifting of second outer form 200.

In operation, form 200 is utilized in the same manner as form 50, except the absence of beams 140 and 142 substantially improves the ability to pour concrete 238 or other solidifiable substances into open top perimeter 209 for the filling of interior form cavity 240. Additionally, the provision of corner lacking assemblies 202-208 allows tandem jacking of form 200 in a manner that substantially precludes binding that may occur from the use of a central jacking 140 and 142. By way of example, placing bottle jacks at each of corner jacking assemblies 204 and 208 will enable simultaneous use of the jacks in a manner that effectively transfers force across a diagonal line (not depicted) drawn between assemblies 204 and 208. This jacking method is much less likely to induce binding during form removal, because side-to-side tilting of form 200 during jacking will tend to cause form 200 to engage the underlying concrete structure at corner points underlying assemblies 206 and 202. These contact points have a greatly reduced surface area and exhibit correspondingly reduced frictional forces, thus reducing the possibility of binding during form removal.

Although the invention has been illustrated in the context of producing a storm shelter, it will be readily apparent to those skilled in the art that the principles of the invention may be used in the manufacture of a wide variety of structures such as pet houses, picnic tables, room modules, sheds, garages, box culverts and columns.

We claim:

1. A forming system for use in fabricating integral structures, said system comprising:

an inner core form member presenting an outer surface corresponding to a desired inner surface for said structure;

an outer form member presenting a circumferentially extending sidewall and a pair of opposed, open ends, said sidewall having an inner surface corresponding to a desired outer surface for said structure, said inner core form member being at least partially located within confines of said outer form member, with a distance between said inner core form member outer surface and said outer form member inner surface defining a wall thickness of said structure; and means for selectively separating said outer form member from said formed structure, and for selectively separating said inner core form member from said formed structure, said separating means including at least a pair of spaced, opposed jacking assemblies operatively secured to said outer form member adjacent an upper open end thereof, each of said jacking assemblies comprising an individual jack and an individual jacking plate separate from said opposed jacking assembly jack and jacking plate, and each jacking plate being spaced above said upper open end a distance for placement of said individual jack atop said structure and beneath said jacking plate for, upon operation of said jacks, separation of said outer form member from said structure.

2. The forming system of claim 1, said inner core form member being circumferentially unitary.

3. The forming system of claim 2, said inner core form member including a unitary, circumferential sidewall with an end panel closing one end of said sidewall.

4. The forming system of claim 1, said inner core form member including a base with an upstanding, circumferentially unitary sidewall secured to said base and a top panel closing an upper end of said sidewall, said base including a plurality of selectively operable jacking assemblies located for engaging an underside of a formed structure for elevating said structure above said base and thereby separating said formed structure from said inner core form member.

5. The forming system of claim 4, said sidewall of said inner core form member being tapered and converging from said base to said top panel.

6. The forming system of claim 4, said sidewall of said inner core form member being formed of four interconnected sidewall panel sections.

7. The forming system of claim 1, including a mesh of reinforcing bars located between said inner core form member and said outer form member.

8. The forming system of claim 7, said mesh including an attachment segment extending beyond said outer form member.

9. The forming system of claim 1, including wall means extending between said inner core form member and said outer form member for defining an opening in a wall of said formed structure.

10. A method of fabricating an integral structure, comprising the steps of:

providing an inner core form member presenting an outer surface corresponding to a desired inner surface for a formed structure;

providing an outer form member presenting a circumferentially extending sidewall and a pair of opposed, open ends, said sidewall having an inner surface corresponding to a desired outer surface for said formed structure;

interfitting said inner and outer form members such that said inner core form member is at least partially located within confines of said outer form member, with a distance between said inner core form member outer surface and said outer form member inner surface defining a wall thickness for said formed structure;

placing a flowable, castable material between said inner core form member and said outer form member, and allowing said material to solidify and form said structure;

separating said outer form member from said structure by placing at least a pair of individual jacks in spaced, generally opposed relationship atop said formed structure and beneath corresponding individual jacking plates separately secured to said outer form member, and operating said jacks to separate said outer form member from said structure; and separating said structure from said inner core form member.

11. The method of claim 10, including the step of jacking said outer form member away from said formed structure a distance sufficient to separate said outer form member from said structure, and thereafter lifting said outer form member away from said formed structure.

12. The method of claim 10, including the step of jacking said formed structure away from said inner core form member a distance sufficient to separate said formed structure from said inner core form member, and thereafter lifting said formed structure away from said inner core form member.

* * * * *

UNITED STATES PATENT AND TRADEMARK OFFICE
CERTIFICATE OF CORRECTION

PATENT NO. : 5,376,315
DATED : December 27, 1994
INVENTOR(S) : Obed M. Fricke

It is certified that error appears in the above-indentified patent and that said Letters Patent is hereby corrected as shown below:

Title page, item [73], Assignee: delete "Kansas State University Research Foundation, Manhattan, Kans."

Signed and Sealed this

Eighteenth Day of April, 1995

Attest:

BRUCE LEHMAN

*Attesting Officer*  *Commissioner of Patents and Trademarks*